Sept. 29, 1959 R. B. STEELE 2,906,859
METHOD AND APPARATUS FOR ELECTRIC ARC WELDING
Original Filed Oct. 8, 1954 2 Sheets-Sheet 2
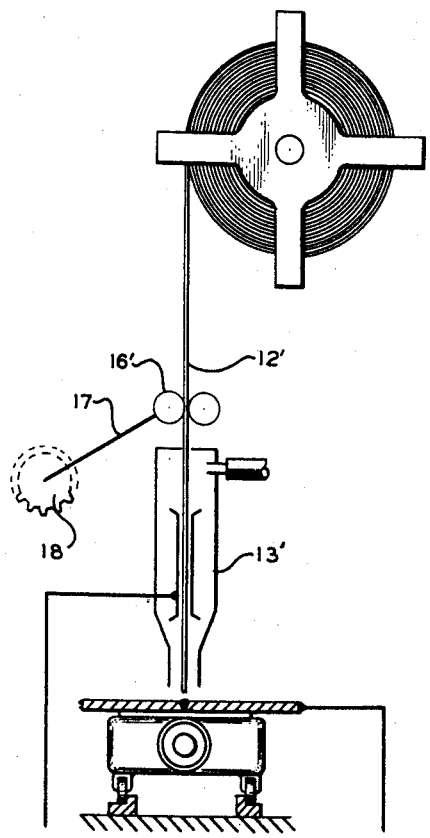
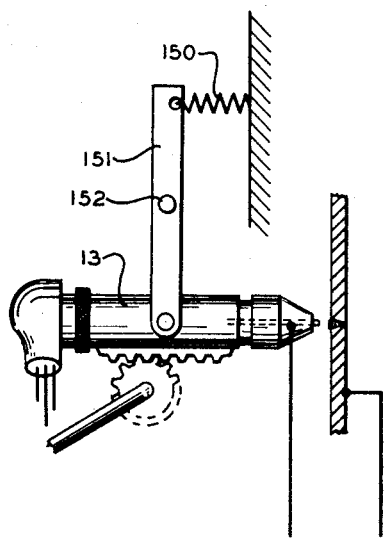
INVENTOR.
RICHARD B. STEELE

United States Patent Office 2,906,859
Patented Sept. 29, 1959

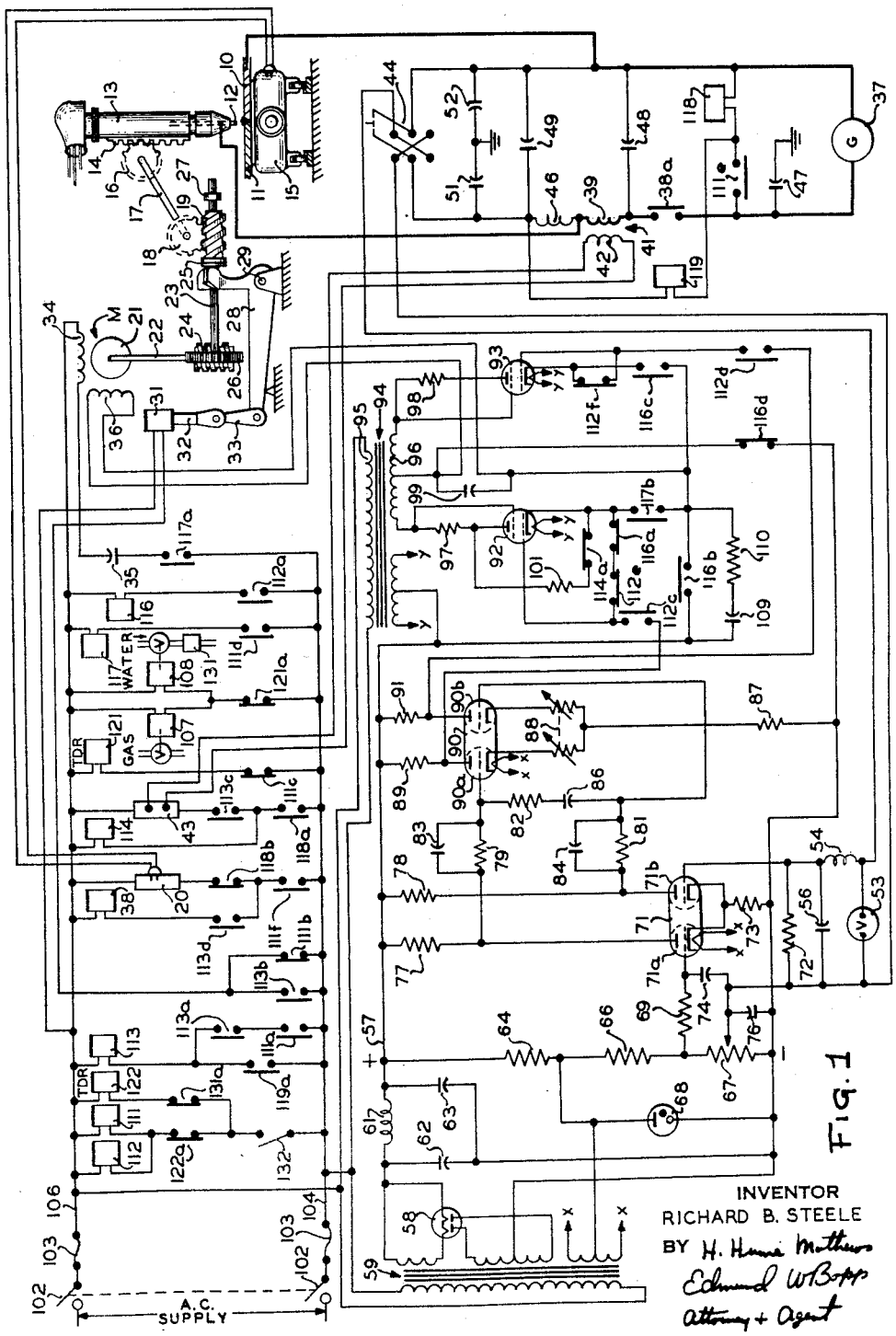

2,906,859

METHOD AND APPARATUS FOR ELECTRIC ARC WELDING

Richard B. Steele, Scottsdale, Ariz., assignor to Air Reduction Company, Incorporated, New York, N.Y., a corporation of New York Original application October 8, 1954, Serial No. 461,065, now Patent No. 2,832,000, dated April 22, 1958. Divided and this application November 25, 1957, Serial No. 698,850

4 Claims. (Cl. 219—130)

This invention relates to electric arc welding methods and apparatus and more particularly to methods and apparatus for controlling the position of a welding electrode for automatic electric arc welding. This application is a division of copending application Serial No. 461,065, now Patent No. 2,832,000, filed October 8, 1954.

Automatic arc welding heads are now well known in the art and they generally provide an electric motor driven means for advancing and retracting the end of a welding electrode toward and away from a workpiece to be welded in such a manner as to establish an arc from the electrode to the workpiece and thereafter to maintain the spacing of the end of the electrode from the work in a manner to maintain the arc while the electrode and workpiece are moved with respect to one another to thus form a weld. Welding heads of this type have been provided for use with consuming electrodes and with non-consuming electrodes. In general the utility of such heads is limited by the speed of response to variations in arc length which is in part limited by the output power of the adjusting motor or motors. In order to provide adequate power and speed of response it has been the practice in the past to employ two motors which run continuously and provide the rotational input to a differential, the difference output of the differential being used to position the electrode. Such systems are relatively costly, heavy and bulky.

An object of the present invention is to provide novel methods and apparatus employing a single motor to control with adequate power and speed of response the positioning of a welding electrode with respect to a workpiece during welding.

Another object of the invention is to provide novel methods and apparatus for controlling the direction and speed of rotation of a two phase induction motor.

Another object is to provide novel methods and apparatus to compensate electrically for a biasing effect, such as the effect of gravity, on the response of the welding head when automatically establishing and maintaining the welding arc.

Another object is to provide an automatic arc welding head having a novel automatic arc starting system utilizing a high frequency discharge.

These and other objects and advantages of the invention will be pointed out or will become apparent from the following detailed description of one embodiment of the invention shown for purposes of illustration in the accompanying schematic drawing.

Automatic arc welding heads of the prior art have established the welding arc in one of three ways. Either they advanced the energized electrode until it touched the work and then retracted it to form the arc, advanced the energized electrode into contact with a fusible mass, such as a steel wool ball between the end of the electrode and the work, or started the arc by advancing the electrode until the arc gap was bridged by a high frequency discharge. The various systems have the disadvantages of permitting freezing of the electrode to the work, contamination of the electrode if of the non-consumable variety, inconsistency in starting, expense and bother of expendable fusible elements, and the disadvantage of extended high frequency discharge creating interference with communications. By the present invention the electrode is advanced to touch the work with the electrode substantially de-energized and then, simultaneously with the retraction of the electrode, the welding current is turned on and a high frequency discharge is applied to the electrode. This provides positive arc starting with no possibility of electrode sticking or electrode contamination and it eliminates the need for fusible plugs. Further the present invention provides for automatically de-energizing the high frequency source as soon as the arc is established, thus reducing interference with communications to a minimum.

In general this invention contemplates the use of a two phase induction motor of conventional design, which is characterized by its high torque and fast response, to advance and retract a welding electrode with respect to the work to be welded to establish and maintain a welding arc from the electrode to the work having a substantially constant preselected arc voltage. To effect this control of the motor, one field winding is energized by alternating current obtained directly from the service line but phase shifted approximately 90° by a series capacitor. The other field winding is provided with alternating current or pulsating direct current from the same service line but controlled by a D.C. circuit which responds to welding arc voltage. The net current applied to this second motor field winding is either in phase with or 180° out of phase with the service line which makes the energization of this second field winding either lagging or leading the energization of the first field winding by about 90°. This phase relationship determines the direction of rotation of the motor. The speed of rotation is determined by the net value of the current in the second motor field winding. The control circuit is a direct current circuit which compares the arc voltage with a preselected constant voltage and uses the amplified difference voltage to control grid controlled rectifiers in a full wave rectifier circuit. The second motor winding is in the common leg of the full wave rectifier circuit. To increase the torque of the motor a capacitor is provided across the second motor field winding to provide reverse current flow (modified A.C.) in the winding at the opportune time during periods of desired maximum motor energization.

A by-pass of one of the grid controlled rectifiers, which by-pass includes a current limiting resistor, provides fixed energization of the control motor in a direction opposing the mechanical biasing effect of gravity or other fixed mechanical bias applied to the apparatus.

The invention also contemplates a novel combination of electrical control elements which automatically connects the second field winding of the motor across a direct current supply each time the motor is de-energized, to thereby effectively dynamically brake the motor and insure an instantaneous stop.

The novel control circuit of this invention also provides for starting the arc with the aid of a high-frequency discharge of minimum duration which effectively minimizes interference with communications from this source.

For a complete and thorough understanding of this invention reference should be made to the following description and the accompanying drawings.

Fig. 1 illustrates schematically both the electrical and mechanical elements constituting the improved welding head for welding with a non-consumable electrode.

Fig. 2 illustrates a small portion of the apparatus of Fig. 1 modified to feed a consumable electrode.

Fig. 3 illustrates the welding head of Fig. 1 in a horizontal operating position.

Referring to Fig. 1, the workpieces to be welded are designated as 10 and 11 and are shown supported by a motorized carriage 15 in operative position with respect to an arc welding electrode 12 supported by an electrode holder 13. In the form illustrated, the electrode may be a tungsten electrode which is substantially non-consumable and which is surrounded by a flowing stream of inert shielding gas in the now familiar inert gas shielded non-consuming electrode arc welding process. In that instance, the electrode 12 is tightly gripped in the electrode holder which in turn is raised and lowered by appropriate gears, such as the rack 14 and the engaging pinion 16 which acts to raise and lower the entire electrode holder and thus the electrode 12 with respect to the work. The invention is equally applicable, as shown in Fig. 2, to a consuming wire electrode which melts off in the heat of the arc and is transferred across the arc to deposit filler metal on the work. A method and apparatus for welding of this type is disclosed in Muller et al. Patent Number 2,504,868, issued April 18, 1950. In such a welding system nip rollers 16' engage the wire 12' directly to support it and feed it through the welding head 13'. Where the present invention is applied to this type welding the nip rollers are driven by the same mechanism to be hereinafter described that drives the pinion gear 16 in the form of the invention illustrated in Fig. 1. The pinion gear 16 is rotated by shaft 17 driven by worm-wheel 18. The mechanical rotation of worm-wheel 18 is derived from the rotation of worm 19 and from limited axial translation of worm 19 while it is in engagement with the worm-wheel. The rotation of worm 19 results from the rotation of armature 21 of a motor M transmitted through shafts 22 and 23 and the inter-connecting speed reducing worm gear set 24, 26. It is obvious from this mechanical schematic drawing that rotation of motor armature 21 in one direction will cause the electrode holder 13, and hence the electrode 12, to be moved in a direction away from the work, whereas rotation of the motor armature 21 in the opposite direction will cause the electrode to be moved toward the work. Shaft 23 is splined to permit axial movement of worm 19 along the shaft without permitting relative rotation between the worm and the shaft. Collar 27 limits the movement of the worm along the shaft in one direction. A bifurcated crank 28 having a fixed pivot point 29 straddles the shaft 23 in such a manner as to bear against the worm 19 through a thrust bearing 31, and in so doing limits the axial displacement of worm 19 along the shaft 23 in the other direction. With the orientation of the apparatus as schematically illustrated, gravitational force tends to rotate pinion gear 16 in a clockwise direction. This in turn teds to rotate worm-wheel 18 in a clockwise direction and the worm gear 19 advances to the left until it comes to rest against the thrust bearing 25 which in turn rests against the bifurcated crank 28. An arc starting solenoid having a magnetizing winding 31, has its armature 32 connected through link 33 to the crank 28. When this solenoid is de-energized, the armature drops down which is in the same direction as the force exerted on the armature through the crank by the weight of the electrode holder 13. When the winding 31 of the solenoid is energized, as will be fully explained hereinafter, the armature 32 pulls in, rotating the crank 28 about its pivot point 29 in a clockwise direction, which slides the worm 19 along the shaft 23 until it comes to rest against the collar 27. This action rotates the worm gear 18 in a counter-clockwise direction which acts to raise the electrode away from the work.

Motor M, is a two-phase induction motor of a conventional design commonly employed in servo-mechanisms. This type motor is characterized by its high torque and fast response. It comprises two field windings 34 and 36, which are independently energized by alternating current, and are approximately 90° out of phase. Thus, if the current in winding 36 leads the current in winding 34, the armature 21 will rotate in a given direction. If the current in winding 36 lags the current in winding 34, the armature 21 will rotate in the opposite direction. Current is supplied to winding 34 from the A.C. supply through phase shifting capacitor 35, as will be more fully described hereinafter. Welding current is supplied from a welding machine 37 to the work 10 and the electrode holder 13 (and hence the electrode 12) through the conductors illustrated in the diagram by heavily weighted lines.

A power actuated switch, hereinafter referred to as the welding contactor, has an actuating coil 38 and normally open contacts 38a in the welding circuit. The secondary winding 39 of a radio frequency transformer 41 is also included in the welding circuit for the purpose of introducing into the welding circuit a high frequency high voltage discharge to assist in arc starting. The primary winding 42 of coupling transformer 41 is energized from a high frequency oscillator 43. As is evident from the electrical circuit the voltage appearing across the welding arc gap also appears across the terminals of a double pole double throw switch 44, which permits the arc voltage to be applied to the control circuit with proper polarity regardless of the polarity of the welding operation. Inductance 46 and capacitors 47, 48, 49, 51 and 52 act to filter out from the control circuit and from the welding machine any alternating current component incidental to the application of the high frequency to the welding circuit. Voltmeter 53 is preferably provided in a convenient location to enable the operator to observe the arc voltage at all times. A filter network consisting of the inductance 54 and the capacitor 56 effectively eliminates any low frequency ripple characteristic of the welding current produced by the welding machine 37. Such filtering is particularly necessary with a welding machine of the rectifier type. By virtue of the circuit just described arc voltage appears across resistor 72.

A power supply of conventional design is provided as a source of direct current for the D.C. control circuit to be hereinafter described. It is preferably a full wave rectifier having adequate filtering. In the schematic diagram a full wave high vacuum rectifier tube 58 is appropriately connected in circuit with the power supply transformer 59 to produce a full wave rectified output which is filtered to a substantially smooth direct current by the filter network comprising inductance 61 and capacitors 62 and 63. A voltage dividing circuit including fixed resistors 64 and 66 and the variable control resistance 67 (arc voltage control) is connected across the output of the power supply. The voltage regulator tube 68 assures a constant voltage across that part of the voltage dividing circuit to which it is connected. A stable D.C. reference voltage is therefore established between fixed resistance 66 and the variable resistance 67. This voltage is applied through resistor 69 to the control grid of one section 71a of a dual triode 71. Arc voltage which appears across resistor 72 as described above is applied to the control grid of the other half 71b of the dual triode 71. A common cathode bias resistor 73 is provided in the cathode circuit. Capacitors 74 and 76 act to filter out transient fluctuations from the voltages applied to the control grids of tube 71. The usual load resistors 77 and 78 in the respective plate circuits of tube 71 are provided. Because of the common cathode resistor 73 an increase in current in tube 71b caused by an increase in arc voltage results in a decrease in current through tube 71a. The amplified voltage difference between arc voltage and the reference voltage as it appears at the plates of tube 71 is applied to a differentiating and integrating circuit of conventional design which effectively prevents hunting. Resistors 79, 81 and 82, and capacitors 83, 84 and 86 constitute the anti-hunt network. The stabilized voltage output of the anti-hunt circuit is applied to the grids of another dual triode amplifier circuit which includes in addition to tube 90 the fixed cathode bias resistor 87, variable resistors 88 also in the cathode circuit, and load resistors 89 and 91 in the plate circuits. Variable resistors 88 act to regulate the amplification (sensitivity) of the control circuit. The output voltages taken from the plate circuits of the amplifier tube 90 are applied to the control grids of tubes 92 and 93. These tubes are connected as grid controlled rectifiers in a full wave rectifier circuit including the power transformer 94 having a primary winding 95 and a main secondary winding 96 connected through resistors 97 and 98 to the plates of tubes 92 and 93 respectively. The center tap of the secondary winding is connected to the cathodes of tubes 92 and 93 through the motor field winding 36 so that it passes pulsating direct current on each half cycle when both tube 92 and 93 are conducting.

When the arc voltage is at the proper preselected value there is an exact balance between the voltage applied to the respective control grids of tube 71. This exact balance is maintained through the amplifier, and in the absence of any other circuitry, balanced full wave rectified pulsating direct current would pass through the motor field winding 36. Since the current pulses in the field winding 36 on one half cycle lead the current in winding 34 and exactly match the current pulses through the field winding 36 on the other half cycle which lag the current in field winding 34, balanced conditions are obtained in the motor and no net rotation of the armature is produced. When the arc voltage is above the preselected value, the control grid of tube 71b becomes more positive with respect to the cathode than does the control grid of tube 71a, and the voltage at the plate of 71b becomes lower than the voltage at the plate of 71a. This produces a proportionately higher voltage at the plate of tube 90b than at the plate of 90a. This permits tube 93 to conduct more current than tube 92 resulting in an unbalance between the half cycles in the full wave rectified current flowing in motor field winding 36 and the motor rotates in a direction to move the electrode toward the work to shorten the arc gap. Conversely, if the arc voltage is too low, the motor moves in a direction to lengthen the arc gap. The control circuit components are preferably so selected that when the voltage between the grids of tube 71 is of the order of magnitude of $\frac{1}{10}$ volt the appropriate tube of tubes 92 and 93 will be biased to cutoff and the other of these tubes will be at full conduction permitting full power output from motor M.

To further increase the power output from the motor M a capacitor 99 may be connected in parallel with the motor field winding 36 to produce some reverse flow of current in the motor field winding during the non-conducting half cycle when one of the tubes 92 or 93 is cut off. This greatly increases the power output of the motor permitting use of a smaller motor than would otherwise be required.

In the particular embodiment of the invention illustrated the conduction of tube 92 provides excitation of the motor field winding 36 in a phase relation to the excitation of motor field winding 34 such as to rotate the motor M in a direction which raises the electrode holder 13 away from the workpiece. The conduction of tube 93 conversely produces rotation of the motor M in a direction to lower the electrode holder 13 toward the workpiece. In the preferred embodiment of the invention, a by-pass is provided around tube 92 through the current limiting resistor 101, permitting limited energization of the motor in a direction to raise the electrode holder. This compensates for the effect of gravity on the apparatus. When the apparatus is used in a position other than the vertical, such as the horizontal position shown in Fig. 3, a spring 150 is preferably utilized to provide a bias force tending to move the electrode holder 13 toward the work. In Fig. 3 the spring is in compression and acts through lever 151, pivoted about pivot point 152, to urge the welding head toward the work.

A capacitor 109 and a current limiting resistor 110 are connected between the positive side of the power supply and the motor field winding 36. These elements form part of the braking circuit for the motor which will be more fully described hereinafter.

Power is supplied to the entire control circuit from an A.C. supply line, preferably 115 volt 60 cycles, through a line switch 102 and protective fuses 103 to conductors 104 and 106. The primary windings of power transformers 59 and 94, the arc starter solenoid 31, the operating coil of welding contactor 38, a power outlet 20 for the motorized carriage 15, the high frequency oscillator 43, a solenoid valve 107 to control the flow of shielding gas to the electrode holder, a solenoid valve 108 to control the flow of cooling water to the electrode holder, the motor field winding 34 and the phase shifting capacitor 35 in series therewith, and a number of control relays to be hereinafter described in greater detail are all connected across the A.C. supply carried by conductors 104 and 106.

A control relay 111 connected across supply conductors 104 and 106 has normally open contacts 111a in the circuit of control relay 113, normally closed contacts 111b in the circuit of the arc starter solenoid 31, normally open contacts 111f in the circuit of the welding contactor 38 and the power outlet 20, normally closed contacts 111c in the circuit of time delay relay 121, normally open contacts 111d in the circuit of control relay 117, and normally open contacts 111e in the circuit of control relays 118 and 119. Control relay 112 connected across supply conductors 104 and 106 has normally open contacts 112a in the circuit of control relay 116, normally open contacts 112c and 112d in the control grid circuits of tubes 92 and 93 respectively, and normally closed contacts 112e and 112f connecting the control grids to the cathodes in tubes 92 and 93 respectively. Control relay 113 connected across the supply conductors 104 and 106 has normally open contacts 113a in its own circuit, normally open contacts 113b in the circuit of the arc starter solenoid 31, normally open contacts 113d in the circuit of the welding contactor 38, and normally open contacts 113c in the circuit of the oscillator 43. Control relay 114 connected across supply conductors 104 and 106 has normally closed contacts 114a in series with current limiting resistor 101 in the circuit by-passing tube 92. Control relay 116 connected across supply conductors 104 and 106 has normally closed contacts 116a in the circuit connecting the cathode of tube 92 to its control grid, normally open contacts 116b and 116c in the cathode circuits of tubes 92 and 93 and normally closed contacts 116d in a braking circuit connecting the motor field winding 36 to the negative side of the D.C. power supply. Control relay 117 connected across supply conductors 104 and 106 has normally open contacts 117a in the circuit of motor field winding 34, and normally open contacts 117b in the cathode circuit of tube 92. Control relay 118 is connected across the output of the welding machine and has normally open contacts 118a in the circuit of oscillator 43, and normally closed contacts 118b in the circuit of the motorized carriage power outlet 20. Control relay 119, connected across the welding contactor in the arc circuit, has normally open contacts 119a in the circuit of control relay 113. Time delay relay 122 is connected in a circuit across the A.C. supply conductors 104 and 106 and has normally closed contacts 122a in the circuit supplying control relays 111 and 112. The contacts 131a of a flow switch 131 that responds to the flow of cooling water are located in the circuit of time delay relay 122 and these contacts are closed when there is insufficient water flow and are open when the cooling water flow is adequate. Time delay relay 121 connected across the line conductors 104 and 106 has normally closed contacts 121a in the circuit supplying the gas and water solenoid valves 107 and 108. A weld switch 132 in the circuit of control relays 111 and 112 and of time delay relay 122 gives the necessary control for starting and stopping the weld cycle.

Operation of the control circuit with the preferred method of arc starting is as follows. The first step is to turn on welding machine 37 and close line switch 102. Closing line switch 102 immediately starts the flow of shielding gas and cooling water by energizing solenoid valves 107 and 108 through the closed contacts 121a of time delay relay 121. Time delay relay 121 is simultaneously energized through the normally closed contacts 111c of control relay 111. Energization of time delay relay 121 starts it timing but produces no immediate change in the condition of the contacts from their condition when the coil is de-energized. Also immediately upon closing line switch 102 the arc starting solenoid 31 becomes energized through contacts 111b, retracting the arc starting solenoid armature 32, advancing worm 19 to its extreme right hand position and raising the electrode holder. The closing of switch 102 also immediately energizes the primaries of power transformers 59 and 94, thereby warming up the filaments of the vacuum tubes. After a time delay of the order of 5 to 10 seconds, time delay relay 121 times out opening its normally closed contacts 121a which deenergizes the solenoid valves and interrupts the flow of shielding gas and cooling water. This preliminary gas flow acts to purge the gas passages of any air that may have entered them by diffusion during an extended period of inactivity. To weld, the operator closes weld switch 132 which immediately and directly energizes control relays 111 and 112 and time delay relay 122. Energization of control relay 111 acts through the opening of its contacts 111c to de-energize time delay relay 121, resetting it and reinstating the contacts in the de-energized position. This results in the opening of solenoid valves 107 and 108 permitting shielding gas and cooling water to flow. If an inadequate supply of cooling water is flowing the water flow switch 131 acts to open contacts 131a, de-energizing time delay relay 122. In the event of inadequate water flow, time delay relay 122 remains energized and after a short delay its contacts 122a open, de-energizing control relays 111 and 112 thereby preventing welding and preventing damage to the equipment by virtue of the lack of adequate cooling. If the cooling water flow is adequate, time delay relay 122 is de-energized as described above, and control relays 111 and 112 remain energized. In addition to resetting time delay relay 121 as described, energization of control relay 111 causes its contacts 111e to close which puts control relay 118 across the welding circuit open circuit voltage which voltage is sufficient to actuate relay 118. Relay 118 preferably picks up at about 45 volts and drops out at about 35 volts. Contacts 118a close energizing control relay 114, opening its contacts 114a in the circuit by-passing tube 92. Contacts 118b open preventing starting of the motorized carriage when contacts 111f close. Control relay 111 when energized also causes control relay 117 to be placed across the line when contacts 111d close. This actuates the contacts of relay 117 in the motor control circuit. When control relay 111 is energized its contacts 111b open de-energizing the arc starting solenoid 31 permitting the electrode holder to drop down into the ready position for arc starting. Control relay 112 which is also energized when the weld switch 132 is closed closes its contacts 112a energizing control relay 116 actuating its contacts in the motor control circuit. It can be seen from this description that at this stage of the sequence of operation all of the contacts of control relays 112, 114, 117 and 116 in the motor control circuit assume the opposite position from those shown in the drawing as these relays are now all energized. The effect of this is that the control grids of tubes 92 and 93 are directly connected through contacts 112c and 112d to the outputs of amplifiers 90a and 90b respectively. The by-pass circuit through resistor 101 around tube 92 is open, the circuits connecting the control grids to the cathodes of tubes 92 and 93 are connected to the positive output of the power supply through contacts 116b, 116c and 117b. Contacts 116d are open disconnecting the motor field winding 36 from the negative side of the D.C. power supply. Because the open circuit voltage of the welding machine greatly exceeds the reference voltage, the comparator and amplifier circuits associated with tubes 71 and 90 hold tube 92 at cut off and cause maximum conduction through tube 93 in the form of pulsating D.C. resulting from the rectified output of transformer 94. Capacitor 99 charges during the conducting half cycle of tube 93 and discharges through motor field winding 36 on the non-conducting half cycle producing modified A.C. in the winding, increasing the torque developed by the motor over that developed by pulsating D.C. excitation, and driving the electrode holder down toward the work.

When the electrode 12 touches the workpiece, the open circuit voltage of the welding machine is applied to control relay 119 energizing it and closing its contacts 119a in the circuit of control relay 113. With contacts 111a of control relay 111 closed and with contacts 113a closed, control relay 113 is locked in across the line. Contacts 113b also close energizing the arc starter solenoid 31 retracting the electrode to establish an arc gap. Simultaneously, contacts 113d close energizing weld contactor 38 closing its contacts 38a placing the welding machine output across the arc gap. When contacts 38a close control relay 119 is short circuited and its contacts 119a reopen. Also concurrently therewith, contacts 113c close energizing the high frequency oscillator 43. The output of this oscillator is coupled to the welding circuit through transformer 41 and the high frequency is thus impressed across the arc gap, ionizing the arc gap and causing the welding arc to be established between the electrode 12 and the workpiece. As soon as the arc is established the relatively low arc voltage is insufficient to maintain control relay 118 in the energized position and it drops out opening its contacts 118a which de-energizes the high frequency oscillator 43, as well as control relay 114. Contacts 118b also close energizing the external power outlet 20 which is preferably used to supply power to the travel mechanism which advances the welding head with respect to the work. De-energization of control relay 114 causes its contacts 114a in the circuit by-passing tube 92 to close, inserting the by-pass circuit and producing a minimum current in the circuit of motor field winding 36 having a phase relationship producing a torque tending to raise the electrode holder. As previously described, this feature is intended to overcome the biasing effect of gravity on the apparatus. The weld now progresses with all contacts in the positions indicated, and the motor control circuit acting to automatically maintain the arc voltage constant by constant automatic comparison of the arc voltage with the fixed reference voltage. At the end of the weld, the operator opens weld switch 132 which de-energizes control relays 111 and 112. De-energization of control relay 111 closes the contacts 111c and starts the time delay relay 121 timing. Contacts 111d open de-energizing control relay 117 which opens contacts 117a in the circuit of motor field winding 34 and opens contacts 117b in the cathode circuit of tube 92. De-energization of control relay 111 also causes contacts 111f to open, interrupting the power to receptacle 20 feeding the travel mechanism and also interrupting the power of the weld contactor 38 opening its contacts 38a. Thus, it may be seen the welding arc is interrupted and the travel of the welding head with respect to the work is simultaneously interrupted. Opening the weld switch 132 as described above also de-energizes the control relay 112 returning all its contacts to the de-energized condition. Thus, de-energized control relay 112, opens its contacts in the control grid circuits of tubes 92 and 93, and closes the contacts connecting the control grids to the cathodes in tubes 92 and 93. Similarly the contacts of control relay 116 return to their de-energized position, completing the circuit connecting the control grid to the cathode in tube 92, opening the contacts in the cathode circuits of tubes 92 and 93 and closing the contact 116d, placing the motor field winding 36 in series with capacitor 109 and resistor 110 across the D.C. power supply. There is a momentary flow of D.C. through motor field winding 36 as a result of this circuit connection as capacitor 109 charges at a rate controlled by the impedance of resistor 110 and the motor field winding 36. The application of direct current to the field winding 36 as a result of the circuit connections just described, acts to instantly and effectively brake the motor M and eliminates any coasting or overtravel. Capacitor 109 discharges through contacts 116b when the contacts close on the next weld cycle. When time delay relay 121 times out its contacts 121a open de-energizing the gas and water solenoid valves and thereby interrupting the gas and water flow. The water flow switch 131 then closes its contacts 131a. Opening line switch 102 completely de-energizes the controls, and when the welding machine 37 is turned off the entire circuit is returned to the inoperative condition.

It is obvious that other accessories and devices may be automatically operated by the above described circuit in the same manner and from the same or a similar power receptacle as the motorized carriage described herein. It is also obvious that additional circuitry can be added to that described to provide the operator with manual control of the apparatus and with optional starting sequences. Also such embellishments as limit switches etc., have not been described herein in the interest of maintaining maximum simplicity.

While only one embodiment of the invention has been shown and described herein, it is to be understood that the invention is not limited to the particular form shown, but may be used in other ways without departing from its spirit as defined by the following claims.

I claim:

1. A method of electric arc welding comprising advancing an electrode into electrical contact with the work to be welded; substantially simultaneously thereafter withdrawing said electrode from said workpiece to establish an arc gap therebetween, applying a high frequency high voltage to said electrode and said workpiece, and applying the open circuit voltage of a welding current source to said electrode and said workpiece whereby a welding arc is established; and immediately upon the drop in voltage across said arc gap from the open circuit voltage of the welding current source to arc voltage as a result of the establishment of said arc, interrupting the high frequency voltage supply and starting relative motion between the electrode and the work in a direction generally parallel to the surface of the work, to thereby effect the weld.

2. Automatic electric arc welding apparatus comprising an electrode holder, electric motor driven means for moving said electrode holder toward and away from a workpiece to be welded, electro-magnetic means for moving said electrode holder toward and away from said workpiece in a limited motion superimposed on the motion imparted to said electrode holder by said electric motor driven means, motor control means operable to energize said electric motor driven means to advance said electrode holder until said electrode makes electrical contact with said workpiece, control means operable to substantially simultaneously thereafter energize said electro-magnetic means to retract said electrode holder a predetermined distance to establish a welding arc gap, connect said electrode and said workpiece to a source of welding current, and energize a source of high frequency current at high voltage to thereby establish a welding arc between said electrode and said workpiece, and control means operable upon the initiation of said welding arc to de-energize said source of high frequency current.

3. Automatic electric arc welding apparatus according to claim 2 including electric motor driven means for moving said electrode relative to said workpiece in a direction generally parallel to the surface of the workpiece and control means operable upon the initiation of said welding arc to energize said last named electric motor driven means to move said electrode relative to said workpiece to form a weld.

4. Automatic electric arc welding apparatus according to claim 3 including control means for automatically energizing said electric motor driven means for moving the electrode holder toward and away from the workpiece in a manner to maintain the voltage across said welding arc substantially constant as said electrode is moved relative to said workpiece in a direction generally parallel to the surface of said workpiece to form the weld.

References Cited in the file of this patent

UNITED STATES PATENTS

| | | |
|---|---|---|
| 1,497,071 | Daykin | June 10, 1924 |
| 1,638,024 | Woodrow | Aug. 9, 1927 |
| 1,712,114 | Khekstad | May 7, 1929 |
| 2,460,990 | Kratz et al. | Feb. 8, 1949 |